US012070809B2

(12) United States Patent
Sitter et al.

(10) Patent No.: US 12,070,809 B2
(45) Date of Patent: Aug. 27, 2024

(54) BAND SAW

(71) Applicant: MILWAUKEE ELECTRIC TOOL CORPORATION, Brookfield, WI (US)

(72) Inventors: James C. Sitter, Milwaukee, WI (US); Kevin Staszak, New Berlin, WI (US); David A. Bierdeman, New Berlin, WI (US); Kevin R. Gee, New Berlin, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 247 days.

(21) Appl. No.: 16/801,679

(22) Filed: Feb. 26, 2020

(65) Prior Publication Data

US 2020/0276660 A1    Sep. 3, 2020

Related U.S. Application Data

(60) Provisional application No. 62/812,638, filed on Mar. 1, 2019.

(51) Int. Cl.
*B23D 53/12* (2006.01)

(52) U.S. Cl.
CPC ................... *B23D 53/12* (2013.01)

(58) Field of Classification Search
CPC ................... B23D 53/00; B23D 53/12
USPC .......................................................... 7/157
See application file for complete search history.

(56) References Cited

U.S. PATENT DOCUMENTS

| | | |
|---|---|---|
| 1,482,954 A | 2/1924 | Tideman |
| 1,530,682 A | 3/1925 | Lyman |
| 1,955,447 A * | 4/1934 | Wright ................. B23D 75/005 |
| | | 408/230 |
| 2,330,242 A * | 9/1943 | Romero .................. B23B 5/163 |
| | | 408/104 |
| 2,591,999 A | 4/1952 | Barham, Sr. |
| 2,596,081 A | 5/1952 | Sacrey |

(Continued)

FOREIGN PATENT DOCUMENTS

| | | | |
|---|---|---|---|
| JP | 8-150513 | * | 6/1996 |
| JP | 2001300819 | | 10/2001 |

(Continued)

OTHER PUBLICATIONS

European Patent Office Partial Seach Report for Application No. 20159763 dated Jul. 8, 2020 (13 pages).

(Continued)

*Primary Examiner* — Adam J Eiseman
*Assistant Examiner* — Richard D Crosby, Jr.
(74) *Attorney, Agent, or Firm* — Michael Best & Friedrich LLP

(57) ABSTRACT

A handheld band saw includes a housing, a handle coupled to the housing and configured to be grasped by a user during a cutting operation, a motor supported by the housing, and a drive wheel assembly rotationally driven by the motor. The drive wheel assembly at least partially disposed within the housing. The band saw further includes a saw blade driven by the drive wheel assembly. The saw blade is configured to cut a workpiece during the cutting operation. The band saw further includes a pipe reamer attachment coupled to the drive wheel assembly. The pipe reamer attachment is configured to deburr the workpiece after completion of the cutting operation.

10 Claims, 8 Drawing Sheets

(56) References Cited

U.S. PATENT DOCUMENTS

| | | |
|---|---|---|
| 2,800,933 A | 7/1957 | Michael |
| 2,916,062 A | 12/1959 | Clauson |
| 3,168,848 A * | 2/1965 | Bardenhagen .......... A24C 5/28 |
| | | 83/594 |
| 3,309,050 A | 3/1967 | Blink et al. |
| 3,462,171 A | 8/1969 | Mitty et al. |
| 3,495,483 A * | 2/1970 | Janik ..................... B23B 5/167 |
| | | 408/211 |
| 3,553,802 A | 1/1971 | Stanley |
| 3,559,514 A * | 2/1971 | Brownfield ........... B23D 77/12 |
| | | 408/205 |
| 3,825,355 A | 7/1974 | Martin |
| 4,001,937 A | 1/1977 | Stelljes et al. |
| 4,012,158 A | 3/1977 | Harper |
| 4,023,572 A | 5/1977 | Weigand et al. |
| 4,036,525 A | 7/1977 | Howk |
| 4,082,475 A * | 4/1978 | Kuder .................... B23Q 5/048 |
| | | 30/500 |
| 4,126,340 A | 11/1978 | Pelcin |
| 4,320,680 A | 3/1982 | de la Cruz et al. |
| 4,347,634 A * | 9/1982 | Sawan ................... B23D 45/16 |
| | | 83/881 |
| 4,930,946 A * | 6/1990 | Phillips, Sr. ............ B23B 5/167 |
| | | 408/211 |
| 5,142,825 A * | 9/1992 | Floyd ................... B23D 45/006 |
| | | 30/102 |
| 5,421,091 A | 6/1995 | Gerritsen, Jr. |
| 5,495,672 A * | 3/1996 | Kritchever et al. ... B23D 21/08 |
| | | 30/101 |
| 5,509,206 A * | 4/1996 | Rowe ................... B23D 53/005 |
| | | 83/792 |
| 5,540,613 A * | 7/1996 | Kamiyama ........... F16L 55/265 |
| | | 451/24 |
| 5,720,096 A | 2/1998 | Dorsey |
| 5,727,322 A | 3/1998 | Giacometti |
| 5,755,148 A | 5/1998 | Stumpf et al. |
| 5,779,724 A | 7/1998 | Werner |
| 5,829,142 A * | 11/1998 | Rieser ................... B23D 21/08 |
| | | 30/93 |
| 5,899,796 A * | 5/1999 | Kamiyama ........... F16L 55/265 |
| | | 451/178 |
| 5,943,931 A | 8/1999 | Stumpf et al. |
| 5,957,022 A | 9/1999 | Stumpf et al. |
| 6,134,997 A * | 10/2000 | Rosanova .............. B23D 21/08 |
| | | 30/102 |
| 6,202,311 B1 | 3/2001 | Nickels, Jr. |
| 6,234,881 B1 * | 5/2001 | Martin, Jr. ................ B24B 3/24 |
| | | 451/48 |
| 6,412,376 B1 * | 7/2002 | Borgia, Jr. ............. B23B 5/163 |
| | | 82/113 |
| 6,418,830 B1 | 7/2002 | Stumpf et al. |
| 6,425,309 B1 | 7/2002 | Stumpf et al. |
| 6,671,969 B2 | 1/2004 | Phillips et al. |
| 6,829,830 B2 | 12/2004 | O'Banion |
| 6,857,943 B2 * | 2/2005 | Kapgan ................... F16F 15/00 |
| | | 451/61 |
| RE40,349 E | 6/2008 | Blum et al. |
| 7,395,603 B2 | 7/2008 | Sugiura et al. |
| 7,424,779 B2 | 9/2008 | Tozawa et al. |
| 7,426,786 B2 | 9/2008 | Beville et al. |
| 7,430,807 B2 | 10/2008 | Saegesser et al. |
| 7,434,502 B2 | 10/2008 | Keeton et al. |
| 7,437,824 B2 | 10/2008 | Chreene et al. |
| 7,441,487 B2 | 10/2008 | Liu et al. |
| 7,497,017 B2 | 3/2009 | Bone et al. |
| 7,540,122 B2 * | 6/2009 | Trudeau ................ B27G 13/002 |
| | | 52/DIG. 1 |
| D627,203 S | 11/2010 | Serdynski et al. |
| 7,926,187 B2 | 4/2011 | Uehlein-Proctor et al. |
| 8,230,605 B2 | 7/2012 | Oberheim |
| 8,549,759 B2 | 10/2013 | Bertsch et al. |
| 8,549,760 B2 | 10/2013 | Bertsch et al. |
| 8,640,346 B2 | 2/2014 | Allen et al. |
| 8,677,633 B2 | 3/2014 | Holly et al. |
| 9,038,277 B2 | 5/2015 | Steele et al. |
| 9,701,035 B2 | 7/2017 | Bertsch et al. |
| 10,183,349 B2 | 1/2019 | Bertsch et al. |
| 10,357,835 B2 | 7/2019 | Steele et al. |
| 10,953,482 B2 | 3/2021 | Steele et al. |
| 2001/0001375 A1 | 5/2001 | Meredith et al. |
| 2002/0059732 A1 | 5/2002 | Campbell et al. |
| 2004/0020061 A1 | 2/2004 | O'Banion |
| 2004/0158996 A1 | 8/2004 | McIntosh |
| 2005/0000338 A1 | 1/2005 | Wascow |
| 2005/0093359 A1 | 5/2005 | Hobb et al. |
| 2005/0183271 A1 | 8/2005 | Sugiura et al. |
| 2005/0283984 A1 | 12/2005 | Walmsley |
| 2006/0014480 A1 * | 1/2006 | Aloise .................... B24B 19/04 |
| | | 451/149 |
| 2006/0288591 A1 | 12/2006 | Chreene et al. |
| 2007/0000137 A1 | 1/2007 | Beville et al. |
| 2008/0047150 A1 | 2/2008 | Phillips et al. |
| 2008/0148915 A1 | 6/2008 | Nickels et al. |
| 2008/0172891 A1 | 7/2008 | Nie |
| 2008/0219790 A1 * | 9/2008 | Zick et al. .......... B23B 31/1071 |
| | | 408/211 |
| 2008/0224514 A1 | 9/2008 | Zink et al. |
| 2008/0235961 A1 | 10/2008 | Chreene et al. |
| 2009/0025520 A1 | 1/2009 | Heinrichs et al. |
| 2009/0071017 A1 | 3/2009 | Gehret |
| 2009/0113727 A1 | 5/2009 | Chen |
| 2009/0205211 A1 | 8/2009 | Nickels, Jr. et al. |
| 2009/0241353 A1 | 10/2009 | Ericson et al. |
| 2009/0265943 A1 | 10/2009 | Miller et al. |
| 2009/0277315 A1 | 11/2009 | Ipatenco et al. |
| 2009/0301278 A1 | 12/2009 | Agan et al. |
| 2010/0018064 A1 | 1/2010 | Bertsch et al. |
| 2010/0287782 A1 | 11/2010 | Bertsch et al. |
| 2011/0045746 A1 * | 2/2011 | Bowles ................... B24B 9/007 |
| | | 451/356 |
| 2011/0083330 A1 | 4/2011 | Steele et al. |
| 2011/0119934 A1 | 5/2011 | Bertsch et al. |
| 2011/0296696 A1 * | 12/2011 | Holly ..................... B23D 53/12 |
| | | 30/380 |
| 2020/0001382 A1 | 1/2020 | Kani et al. |
| 2020/0391296 A1 * | 12/2020 | Baldwin ................ B23D 53/12 |

FOREIGN PATENT DOCUMENTS

| | | | |
|---|---|---|---|
| JP | 2004345041 | | 12/2004 |
| JP | 2004345042 | * | 12/2004 ............ B23D 53/06 |
| JP | 2004345042 A | | 12/2004 |
| JP | 2016140939 A | | 8/2016 |

OTHER PUBLICATIONS

European Patent Office Extended Seach Report for Application No. 20159763 dated Nov. 12, 2020 (11 pages).
Milwaukee Deep Cut Saw Model 6230N, Operator's Manual, known at least as early as Sep. 15, 2009, 13 pgs.
Milwaukee Deep Cut Saw Model 6230N, Service Parts List, Nov. 2011, 2 pgs.
Milwaukee Cordless Band Saw Model 0729-20, Service Parts List, Feb. 2009, 2 pgs.
Milwaukee Cordless Band Saw Model 0729-20, Operator's Manual, Jul. 2008, 28 pgs.
Makita 2107F Portable Band Saw, Instruction Manual, known at least as early as Sep. 15, 2009, 24 pgs.
Makita 2107F Portable Band Saw, Parts Breakdown, known at least as early as Sep. 15, 2009, 4 pgs.
European Patent Office Action for Application No. 20159763.0 dated Jun. 24, 2022 (4 pages).

* cited by examiner

BAND SAW

CROSS-REFERENCE TO RELATED APPLICATIONS

This application claims priority to U.S. Provisional Patent Application No. 62/812,638, filed Mar. 1, 2019, the entire content of which is incorporated herein by reference.

BACKGROUND OF THE INVENTION

The present invention relates to a handheld saw, and, more particularly, to a portable band saw. Handheld band saws are used to cut a variety of workpieces, such as pipes, rods, studs, and blocks. A cordless, compact band saw allows for cutting operations in tight spaces or awkward angles for plumbing, electrical, remodeling, and HVAC applications.

SUMMARY OF THE INVENTION

In one aspect, the invention provides a handheld band saw includes a housing, a handle coupled to the housing and configured to be grasped by a user during a cutting operation, a motor supported by the housing, and a drive wheel assembly rotationally driven by the motor. The drive wheel assembly is at least partially disposed within the housing. The band saw further includes a saw blade driven by the drive wheel assembly. The saw blade is configured to cut a workpiece during the cutting operation. The band saw further includes a pipe reamer attachment coupled to the drive wheel assembly. The pipe reamer attachment is configured to deburr the workpiece after completion of the cutting operation.

In another aspect, the invention provides a handheld band saw including a housing, a handle supported by the housing and configured to be grasped by a user during a cutting operation, a motor supported by the housing, and a drive wheel assembly rotationally driven by the motor. The drive wheel assembly is at least partially disposed within the housing. The band saw further includes a saw blade driven by the drive wheel assembly. The saw blade is configured to cut a workpiece during the cutting operation. The band saw further includes a shoe coupled to the housing adjacent the saw blade. The shoe is configured to support a workpiece during the cutting operation. The shoe includes a slide mechanism for adjusting the shoe along a shoe axis that is perpendicular to the saw blade, and a detent mechanism having a tooth that is selectively receivable in one of a plurality of notches for maintaining the shoe in a discrete position along the shoe axis. The tooth has a cam surface shaped to permit removal of the tooth from one of the plurality of notches when a force is applied to the shoe in the direction of the shoe axis, thereby causing the shoe to move along the shoe axis.

In yet another aspect, the invention provides a handheld band saw including a housing, a handle supported by the housing and configured to be grasped by a user during a cutting operation, and a motor supported by the housing. The band saw further includes a drive wheel assembly that is at least partially disposed within the housing. The band saw further includes a saw blade driven by the drive wheel assembly and configured to cut a workpiece during the cutting operation. The band saw further includes a drive assembly positioned between the motor and the drive wheel assembly. The drive assembly is configured to transfer torque from the motor to the drive wheel assembly, causing the drive wheel assembly and the saw blade to rotate. The drive wheel assembly includes a wheel having a recess in which a portion of the drive assembly is received to shorten an overall length of the motor, drive assembly, and drive wheel assembly.

DETAILED DESCRIPTION

Figure 1:
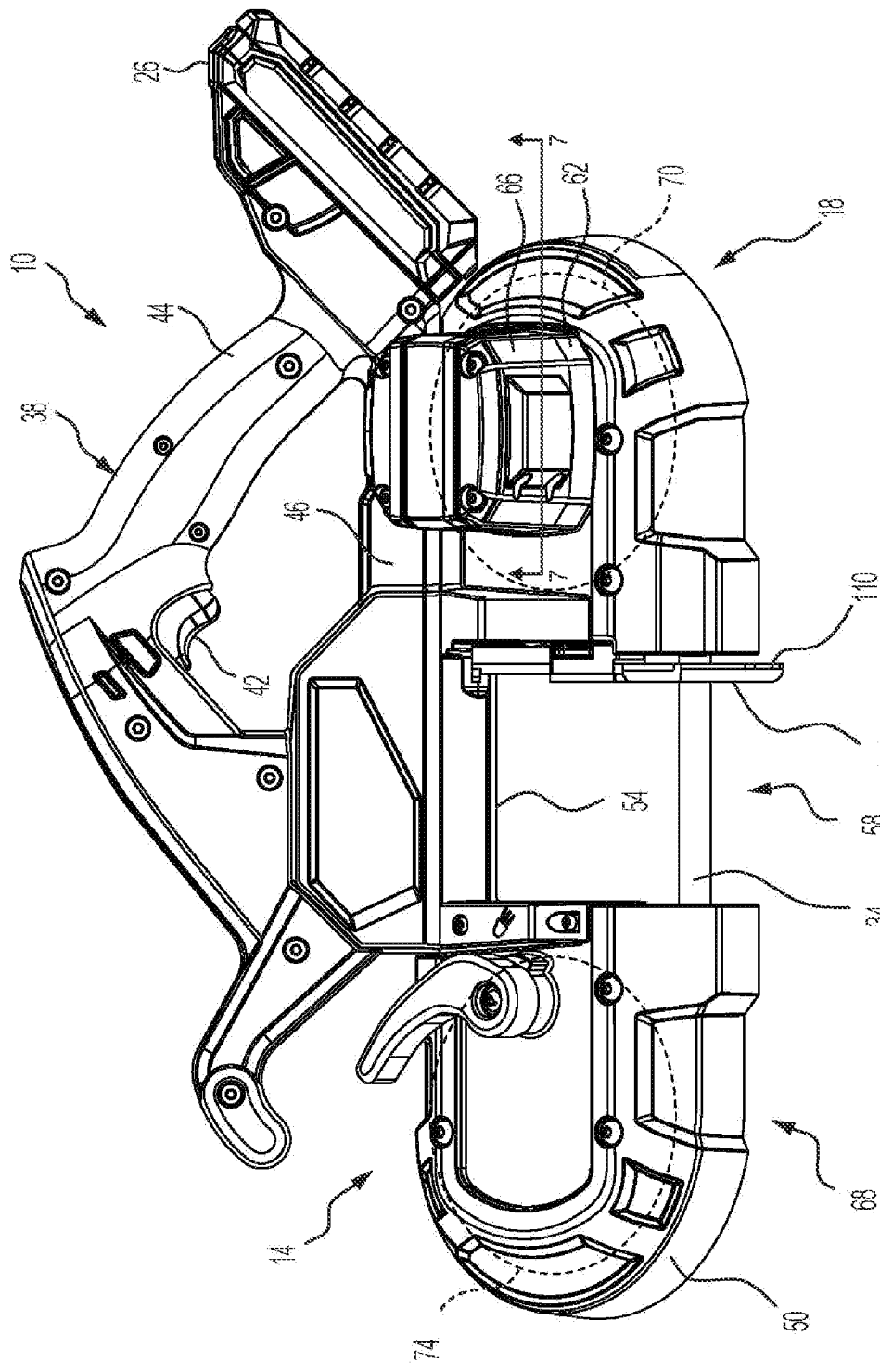
FIG. 1 is a perspective view of a handheld band saw.
Figure 7:
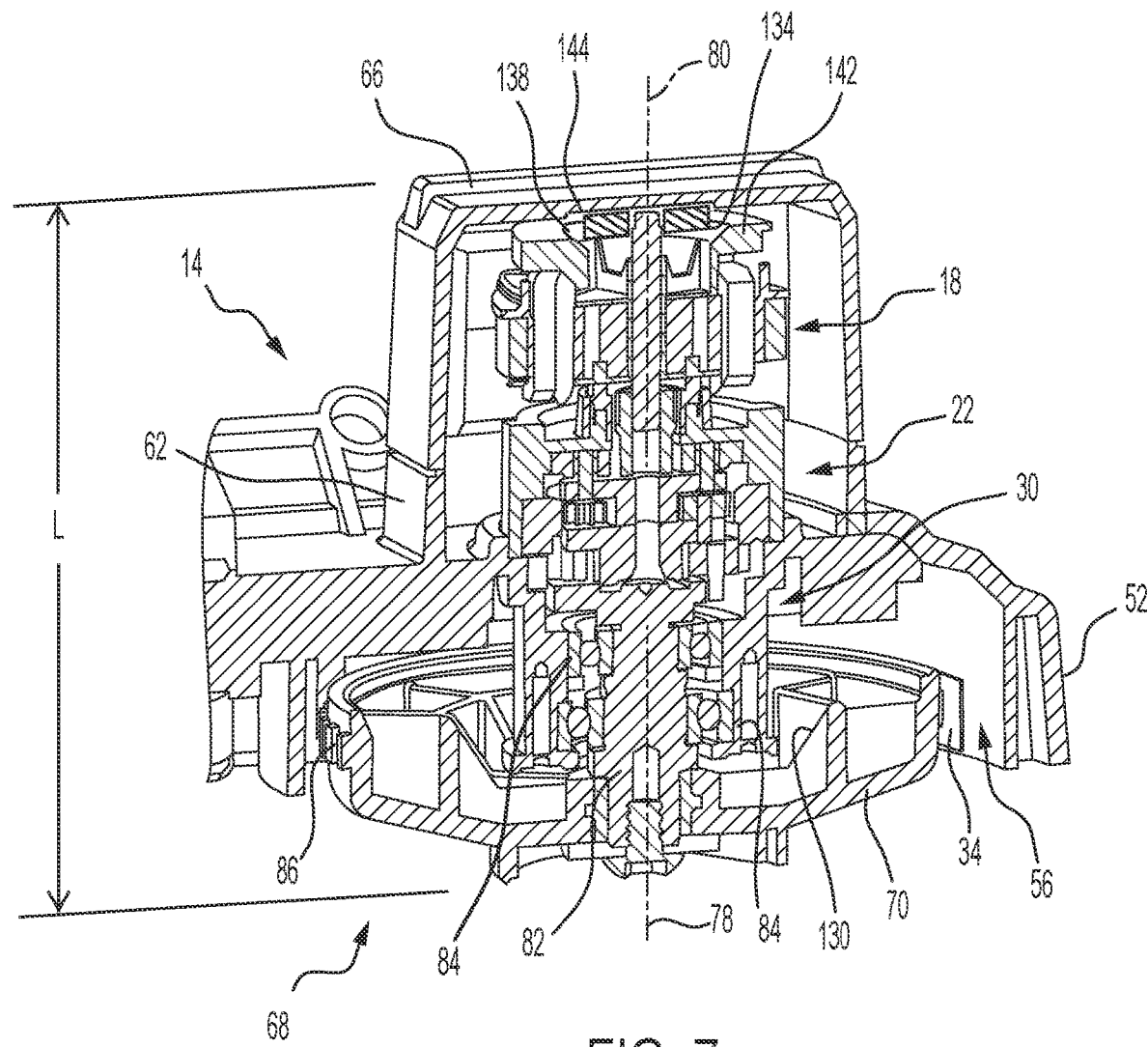
FIG. 7 is a cross-sectional view of a motor of the band saw taken along line 7-7 of FIG. 1.

FIG. 1 illustrates a band saw 10 including a frame or housing 14 supporting a motor 18 and a gear box 22 (FIG. 7). In the illustrated construction of the band saw 10, the motor 18 is configured as a DC brushless motor, and the band saw 10 includes a removable, rechargeable battery 26 for supplying power to the band saw 10. The motor 18 is drivingly connected to a drive assembly 30 through a gear box 22. The motor 18, the drive assembly 30, and the gear box 22 are supported by the housing 14. The drive assembly 30 may include any of a number of bearing arrangements and different gear train arrangements configured to provide a low-speed, high-torque output from the high-speed, low-torque input provided by the motor 18. The motor 18 and the drive assembly 30 are operable to drive a continuous band saw blade 34 to cut a workpiece (FIG. 1).

With continued reference to FIG. 1, the housing 14 includes a main handle 38 with a trigger 42 to provide power to the band saw 10. The trigger 42 is disposed adjacent a gripping portion 44 of the handle 38 where a user grasps the band saw 10. In the illustrated construction of the band saw 10, the battery 26 is supported by the main handle 38 and is an 18-volt power tool battery 26. In other embodiments, the battery 26 may be supported on the housing 14. The trigger 42 is operable to control operation of the motor 18. Specifically, the battery 26 selectively supplies power to the motor 18 when the trigger 42 is actuated. The housing 14 of the band saw 10 also includes a deck 46 and a guard 50 coupled to the deck 46. A combination of the deck 46 and the guard 50 defines an opening or U-shaped cavity 54. The guard 50 includes a lip 52 that provides a recessed area 56 (FIG. 7) in which the band saw blade 34 is positioned. The guard 50 substantially covers the band saw blade 34 when the blade 34 is in a shielded position (i.e., when the blade 26 is outside of a cut zone 58; FIG. 1). However, the U-shaped cavity 54 enables the band saw blade 34 to be in an exposed position (i.e., when the blade 26 passes through the cut zone 58; FIG. 1). In the exposed position, the blade 34 is fully exposed and unobstructed by the guard 50, allowing workpieces to be cut when entering the cut zone 58.

With reference to FIGS. 1-4, the deck 46 includes a motor support portion 62 and a separate motor cover 66 that together enclose the motor 18. The band saw 10 further includes a drive wheel assembly 68 that supports and drives the saw blade 34. The drive wheel assembly 68 includes a drive wheel 70 that is directly driven by the motor 18 and a driven wheel 74 that is driven by the drive wheel 70 via the saw blade 34. The outer peripheral surface and the interior side of the drive wheel 70 and the driven wheel 74 are covered by the deck 46 and the guard 50. The drive wheel 70 rotates about a drive wheel axis 78 (FIGS. 2-4) defined by a drive wheel spindle 82 (FIG. 7). The drive wheel spindle 82 is rotationally supported by bearings 84 of the drive assembly 30. The drive wheel 70 is drivingly connected to the motor 18 via the gear box 22, the drive assembly 30, and the drive wheel spindle 82. In the illustrated construction of the band saw 10, the rotational axis 80 of the motor 18 is coaxially aligned with the drive wheel axis 78. In other embodiments, the rotational axis 80 and the drive wheel axis 78 may be parallel or at some other oblique angle relative to each other. A tire 86 is coupled to the outer peripheral surface of each of the wheels 70, 74 (although only one of which is shown). Each tire 86 grips the saw blade 34 to drive motion thereof.

Figure 2:
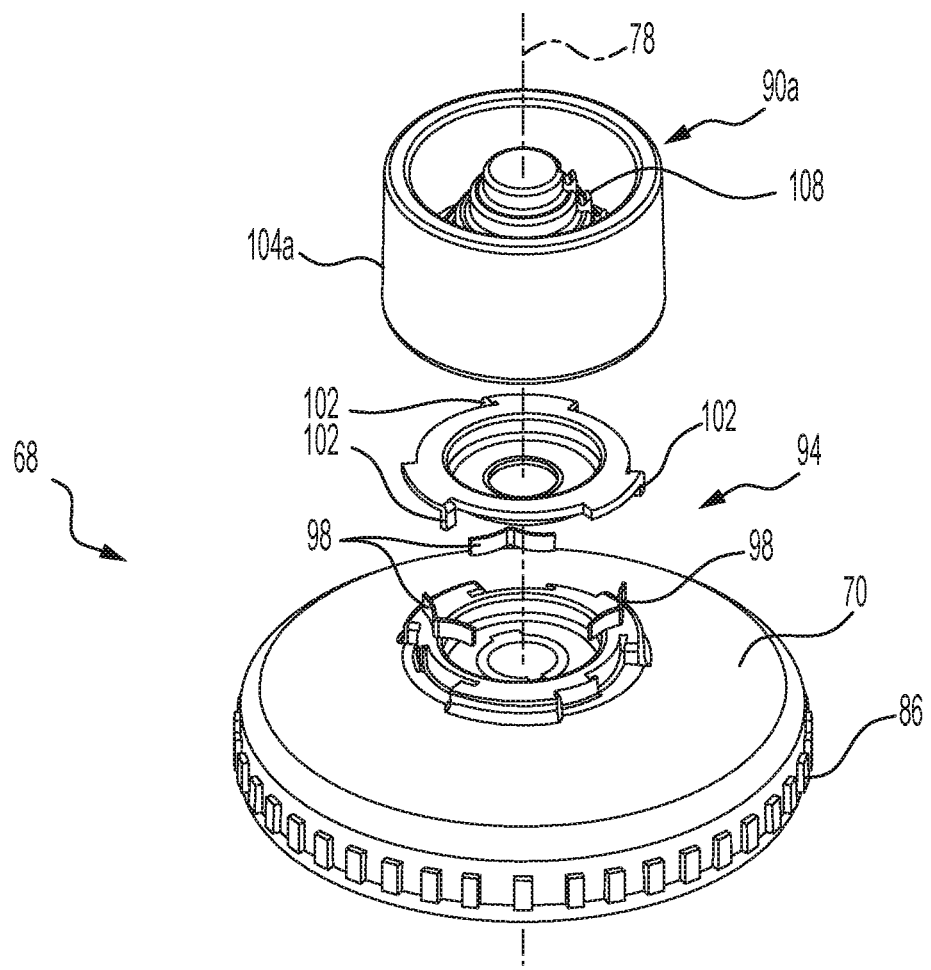
FIG. 2 is an exploded view of a drive wheel assembly of the band saw of FIG. 1, illustrating a pipe reamer attachment removably attached thereto.
Figure 4:
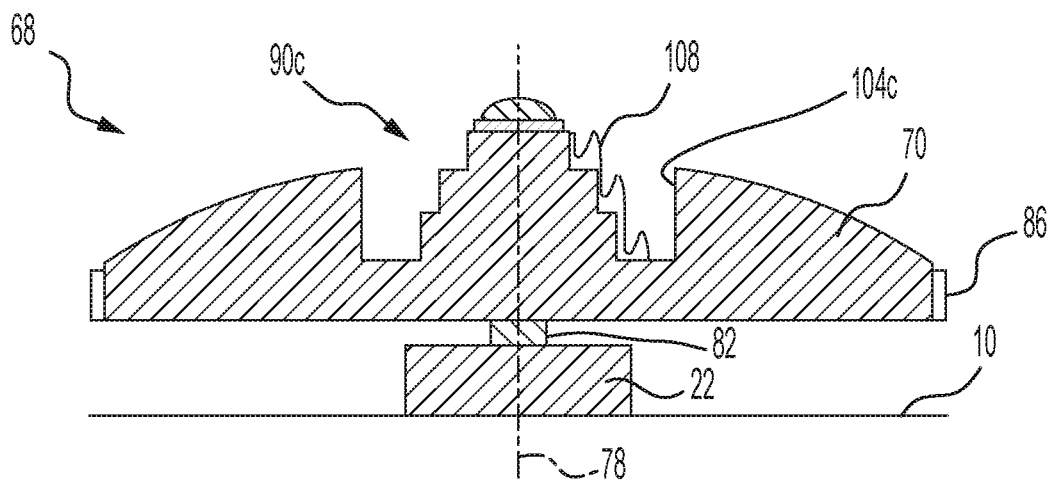
FIG. 4 is a cross-sectional view of yet another embodiment of a drive wheel of the band saw of FIG. 1, illustrating a pipe reamer attachment removably attached thereto.

With reference to FIG. 2, the band saw 10 further includes a pipe reamer attachment 90*a* that is coupled to and driven by the drive wheel assembly 68. Although the pipe reamer attachment 90*a* of the illustrated embodiment is coupled to the drive wheel 70, in other embodiments, the pipe reamer attachment 90*a* may alternatively be coupled to the driven wheel 74. With the pipe reamer attachment 90*a* being coupled to the band saw 10, a user can both cut and ream (i.e., deburr) a pipe with a single tool. In one embodiment, the pipe reamer attachment 90*a* is removably coupled to the drive wheel 70, while in other embodiments, the pipe reamer attachment 90*a* may be permanently coupled to or integrated as part of the drive wheel 70 (FIG. 4). In this embodiment, the pipe reamer attachment 90*a* is coupled to the drive wheel 70 via a quick disconnect coupling 94, as shown in FIG. 2. The quick disconnect coupling 94 includes spring detents 98 that mechanically interface with corresponding projections 102 to maintain the pipe reamer attachment 90*a* on the drive wheel 70. More specifically, when attaching the pipe reamer attachment 90*a* to the drive wheel 70, the projections 102 slide along the spring detents 98 to temporarily deform (i.e., flex) the spring detents 98. Once the projections 102 slide beyond the spring detents 98, the spring detents 98 rebound and create a mechanical interference between the projections 102 and the spring detents 98 to inhibit the piper reamer attachment 90*a* from being removed from the drive wheel 70. During a reaming operation, the drive wheel 70 is driven, for example, in a clockwise direction, while the pipe reamer attachment 90*a* is coupled to the drive wheel 70 by rotating the pipe reamer attachment 90*a*, for example, in a counterclockwise direction so as to inhibit the pipe reamer attachment 90*a* from disconnecting from the drive wheel 70 during operation. The pipe reamer attachment 90*a* includes an annular shroud 104*a* that accommodates pipe ranging from ⅓ inches in diameter to 1 inch in diameter. In other embodiments, the pipe reamer attachment 90*a* may accommodate pipe having a different diameter.

Figure 3:
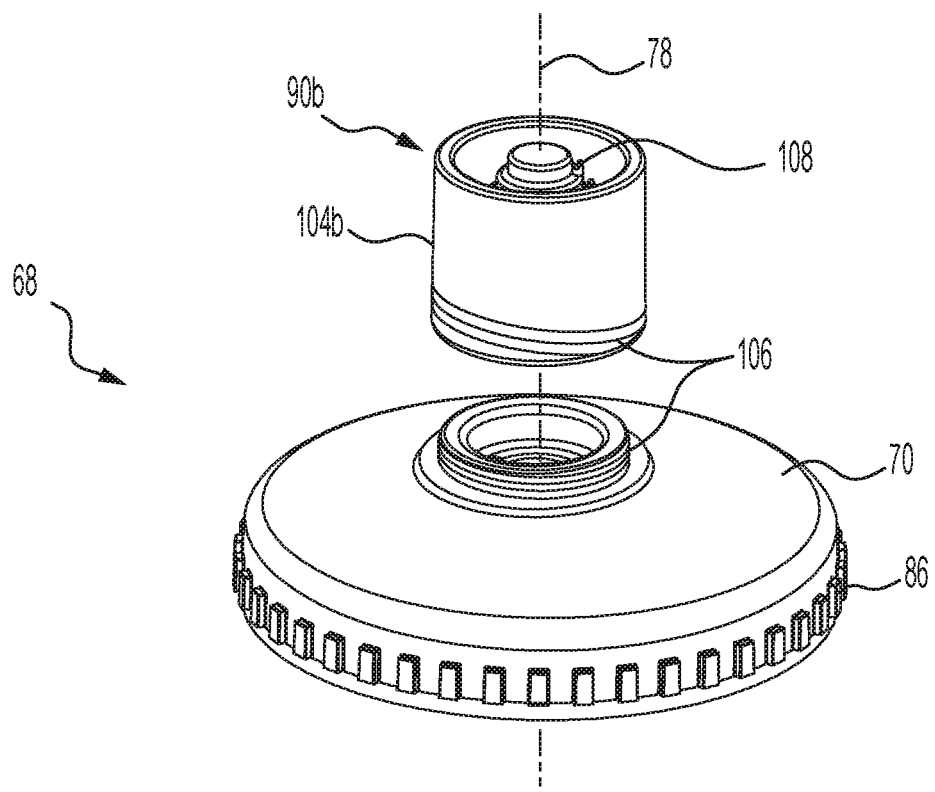
FIG. 3 is an exploded view of an alternative embodiment of a drive wheel assembly of the band saw of FIG. 1, illustrating a pipe reamer attachment removably attached thereto.

FIG. 3 illustrates another embodiment of a pipe reamer attachment 90*b* that is coupled to the drive wheel 70 via a helical thread pattern 106. Specifically, the drive wheel 70 includes a helical thread pattern 106 that engages with a corresponding thread pattern 106 on the piper reamer attachment 90*b*. Again, the pipe reamer attachment 90*b* is rotatably coupled to the drive wheel 70 in an opposite direction of the direction of rotation of the drive wheel 70 to inhibit the pipe reamer attachment 90*b* from disconnecting from the drive wheel 70 during operation. The pipe reamer attachment 90*b* includes an annular shroud 104*b* that accommodates pipe ranging from ⅓ inches in diameter to 1 inch in diameter. In other embodiments, the pipe reamer attachment 90*b* may accommodate pipe having a different diameter.

FIG. 4 illustrates yet another embodiment of a pipe reamer attachment 90*c* that is integrated as part of the drive wheel 70. In other words, the pipe reamer attachment 90*c* and the drive wheel 70 are formed as a single component that is directly coupled to the drive wheel spindle 82. The pipe reamer attachment 90*c* may also be recessed within the drive wheel 70, such that the pipe reamer attachment 90*c* does not extend or extends only slightly beyond the drive wheel 70, as shown in FIG. 4. Still, the pipe reamer attachment 90*c* includes an annular shroud 104*c* that accommodates pipe ranging from ⅓ inches in diameter to 1 inch in diameter. In other embodiments, the pipe reamer attachment 90*c* may accommodate pipe having a different diameter.

Each pipe reamer attachment 90*a*, 90*b*, 90*c* includes a blade 108 for engaging and removing a burr formed on the end of a pipe after the blade 34 has cut the pipe. The blade 108 is disposed within the annular shroud 104*a*, 104*b*, 104*c* to prevent the blade 108 from being exposed from the exterior of the shroud 104*a*, 104*b*, 104*c*. The blade 108 of the illustrated embodiment is a multi-tiered blade, where each tier is capable of engaging a different sized pipe, such as pipes ranging from ⅓ inches in diameter to 1 inch in diameter. In other embodiments, the blade 108 may alternatively be three separate blades.

Figure 5:
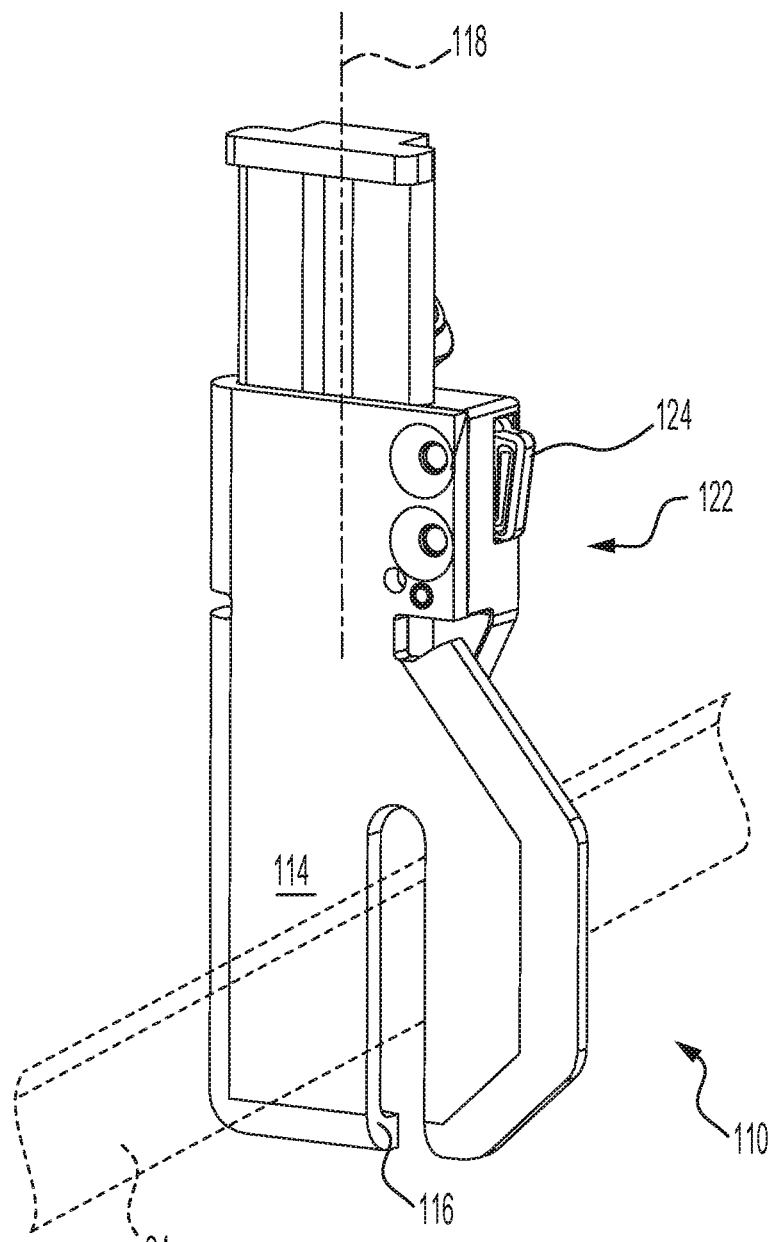
FIG. 5 is perspective view of a shoe of the band saw of FIG. 1, illustrating a slide mechanism that enables the shoe to move along a shoe axis.
Figure 6:
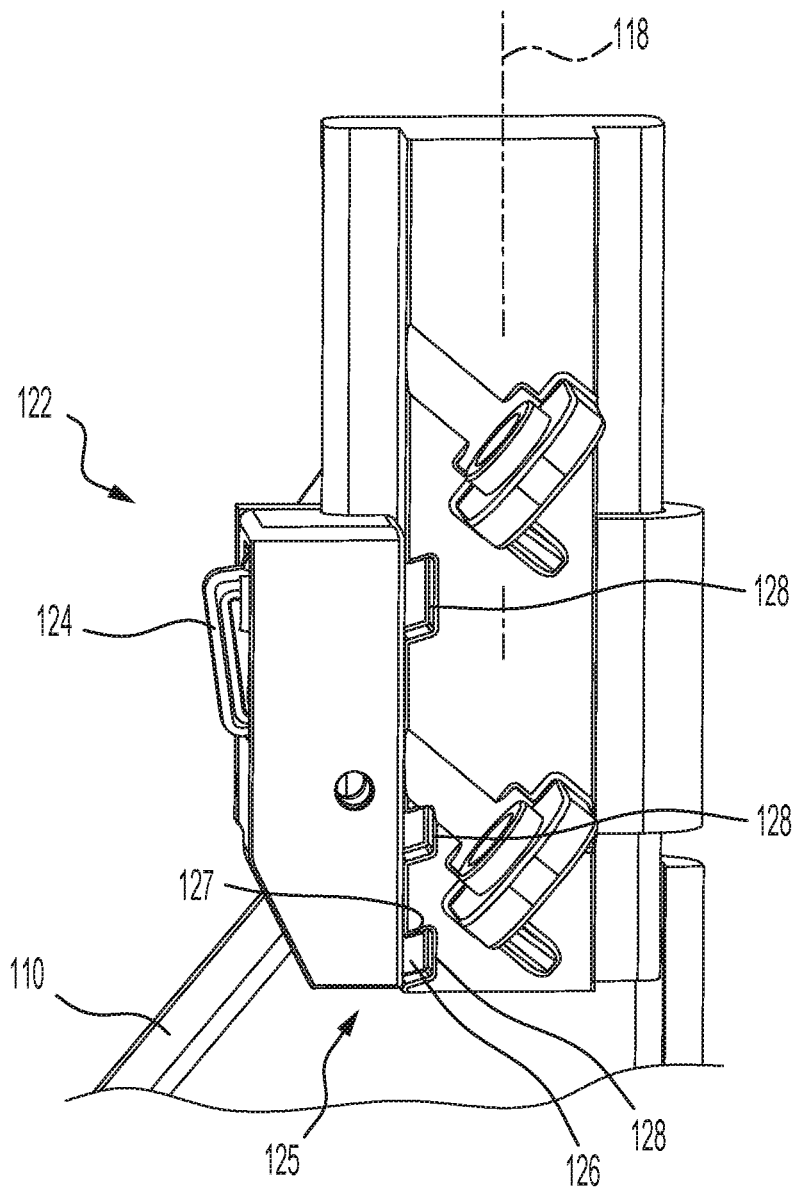
FIG. 6 is an enlarged plan view of the slide mechanism of FIG. 5, illustrating a detent mechanism of the slide mechanism.

With reference to FIGS. 5 and 6, the band saw 10 further includes a shoe 110 having a support surface 114 against which a workpiece is abutted during a cutting operation and a slot 116 through which the saw blade extends. The shoe 110 is adjacent the cut zone 58. The shoe 110 is adjustable along a shoe axis 118 that extends substantially parallel with the saw blade 34. By adjusting the shoe 110 along the shoe axis 118, the support surface 114 is moveable to support and accommodate pipes of varying diameters. The shoe 110 includes a slide mechanism 122 with an actuator 124 that, when depressed, allows a user to move the shoe 110 between a retracted position and an extended position along the shoe axis 118. The slide mechanism 122 maintains the shoe 110 in different predefined positions between the retracted and extended positions via a detent mechanism 125 (FIG. 6). Specifically, the detent mechanism 125 includes a tooth 126 that is actuated via the actuator 124, and a plurality of notches 128 that selectively receive the tooth 126 to maintain the shoe 110 in various predefined positions. When the tooth 126 is in an extended position (as shown in FIG. 6), the tooth is received in one of the notches 128 and inhibits the shoe 110 from moving along the shoe axis 118. In contrast, when the tooth 126 is in a retracted position, the tooth 126 is removed from one of the notches 128 thereby enabling the shoe 110 to move along the shoe axis 118.

However, the detent mechanism 125 is designed in a cam-like manner such that the tooth 126 has a cam surface 127 shaped to permit the tooth 126 to be removed from the notch 128, without depressing the actuator 124, and moved to the retracted position when a sufficient upward force is exerted on the shoe 110 (from the frame of reference of FIGS. 5 and 6). In this case, the shoe 110 retracts to the retracted position in response to a sufficient force being exerted upon the shoe 110. An impact force proportionate to dropping the band saw 10 from a distance greater than approximately two inches above a ground surface is sufficient to cause the shoe 110 to retract to the retracted position when the impact force is exerted on the shoe 110. The resulting impact force exerted upon the shoe 110 overcomes the biasing force of the detent mechanism 125, allowing the shoe 110 to retract via the slide mechanism 122. When the band saw 10 is dropped from a distance less than approximately two inches above a ground surface, the shoe 110 remains in position without retracting to the retracted position because the impact force exerted on the shoe 110 is not sufficient to overcome the biasing force of the detent mechanism 125. The slide mechanism 122 is designed to avoid causing damage to the shoe 110 when the band saw 10 is inadvertently dropped.

Figure 8:
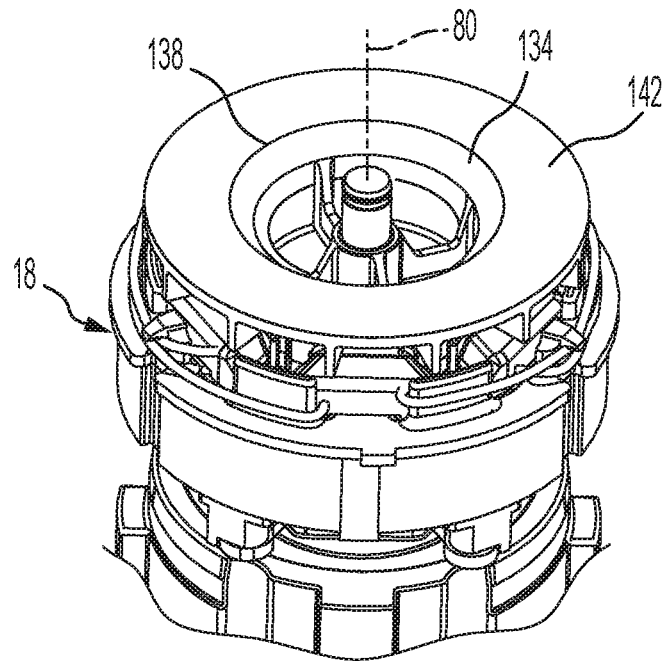
FIG. 8 is a perspective view of the motor of the band saw, illustrating a recess within a motor fan.
Figure 9:
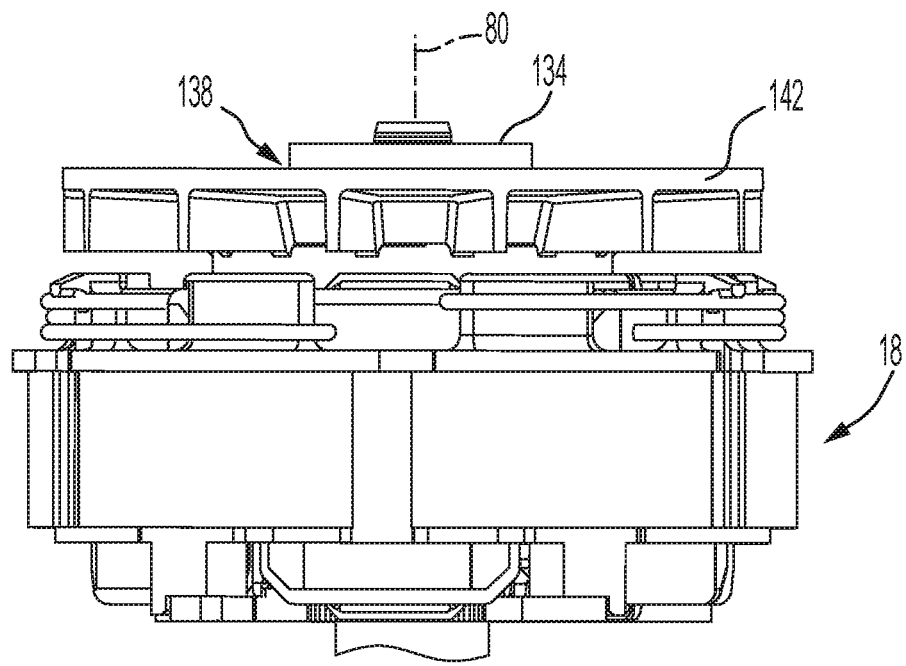
FIG. 9 is a plan view of the motor of FIG. 8.

With reference to FIGS. 7-9, the drive wheel 70 further includes a recess 130 on the interior side adjacent the motor 18. The recess 130 accommodates a portion of the drive assembly 30, as shown in FIG. 7. Also, a top rotor bearing 134 is accommodated within a recess 138 of a motor fan 142, as shown in FIGS. 7-9, and mounted within a corresponding pocket 144 in the motor cover 66 (FIG. 7). As such, the motor cover 66 and the motor fan 142 are spaced apart just enough to avoid mechanical interference, but the gap therebetween is otherwise negligible. The purpose of the recess 130 and the recess 138 is to consolidate the configuration of the motor 18, the gearbox 22, and the drive assembly 30 as much as possible so the motor cover 66 protrudes from the deck 46 as little as possible. By reducing the overall length L between the motor 18, and the drive wheel assembly 68 measured along the rotational axis 80, the band saw 10 is more ergonomic and reduces torque exerted on a user during a cutting and reaming operation. In some embodiments, the overall length L is between 2 inches and 3 inches. And, in some embodiments, the overall length is no more than 2.5 inches.

Various features of the invention are set forth in the following claims.

What is claimed is:

1. A handheld band saw comprising:
   a housing;
   a handle coupled to the housing and configured to be grasped by a user during a cutting operation;
   a motor supported by the housing;
   a drive wheel assembly rotationally driven by the motor, the drive wheel assembly at least partially disposed within the housing and including a drive wheel and a driven wheel;
   a saw blade driven by the drive wheel assembly, the saw blade driveably disposed on an outer periphery of the driven wheel and the drive wheel and configured to cut a workpiece during the cutting operation; and
   a pipe reamer attachment coupled to the drive wheel assembly, wherein the pipe reamer attachment is configured to deburr the workpiece after completion of the cutting operation,
   wherein the pipe reamer attachment includes an annular shroud and a blade disposed within the annular shroud, and wherein the blade and the annular shroud co-rotate with the drive wheel assembly.

2. The handheld band saw of claim 1, further comprising a battery removably coupled to the handle, wherein the battery, when coupled to the handle, is operably coupled to the motor and configured to provide power to the motor.

3. The handheld band saw of claim 2, further comprising a trigger disposed adjacent a gripping portion of the handle, wherein power from the battery is supplied to the motor when the trigger is actuated.

4. The handheld band saw of claim 1, wherein the motor defines a rotational axis, and wherein the pipe reamer attachment is rotationally driven by the motor about the rotational axis.

5. The handheld band saw of claim 1, wherein the pipe reamer attachment is removably coupled to the drive wheel assembly.

6. The handheld band saw of claim 5, further comprising a quick disconnect coupling that allows the pipe reamer attachment to disconnect from the drive wheel assembly by rotating the pipe reamer attachment in a first direction, and wherein the drive wheel assembly rotates in a second direction during the cutting operation that is opposite the first direction.

7. The handheld band saw of claim 1, wherein the pipe reamer attachment is integrally formed with at least one component of the drive wheel assembly to form a single piece.

8. The handheld band saw of claim 1, wherein the pipe reamer attachment is disposed on the drive wheel.

9. The handheld band saw of claim 1, wherein the housing includes a deck and a guard coupled to the deck that cooperatively surround the saw blade in a shielded position, and wherein the deck and guard define a cut zone through which the saw blade passes in an exposed position to engage a workpiece.

10. The handheld band saw of claim 1, wherein the motor defines a rotational axis, and wherein the drive wheel defines a drive wheel axis that is coaxial with the rotational axis.

* * * * *